United States Patent
Taylor

(10) Patent No.: US 7,424,969 B2
(45) Date of Patent: Sep. 16, 2008

(54) CHEQUE DEPOSIT AT A SELF-SERVICE TERMINAL

(75) Inventor: Norman G. Taylor, Dundee (GB)

(73) Assignee: NCR Corporation, Dayton, OH (US)

( * ) Notice: Subject to any disclaimer, the term of this patent is extended or adjusted under 35 U.S.C. 154(b) by 649 days.

(21) Appl. No.: 11/079,848

(22) Filed: Mar. 14, 2005

(65) Prior Publication Data
US 2005/0205661 A1   Sep. 22, 2005

(30) Foreign Application Priority Data
Mar. 16, 2004   (GB) ................................ 0405870.7

(51) Int. Cl.
*G06Q 40/00* (2006.01)
(52) U.S. Cl. ...................... 235/379; 235/381
(58) Field of Classification Search ................ 235/379, 235/381, 383; 705/43
See application file for complete search history.

(56) References Cited

U.S. PATENT DOCUMENTS

| | | | | |
|---|---|---|---|---|
| 6,145,738 A * | 11/2000 | Stinson et al. | ............... | 235/379 |
| 6,195,542 B1 | 2/2001 | Griffith | | |
| 2002/0152166 A1 * | 10/2002 | Dutta et al. | .................. | 705/43 |
| 2002/0152170 A1 * | 10/2002 | Dutta et al. | .................. | 705/45 |
| 2003/0217005 A1 * | 11/2003 | Drummond et al. | .......... | 705/43 |
| 2004/0267663 A1 * | 12/2004 | Karns et al. | .................. | 705/40 |
| 2005/0006458 A1 * | 1/2005 | Wanibe et al. | ............. | 235/379 |

FOREIGN PATENT DOCUMENTS

EP   1 369 832 A2   12/2003

* cited by examiner

*Primary Examiner*—Ahshik Kim
(74) *Attorney, Agent, or Firm*—Gregory A. Welte

(57) ABSTRACT

A system and method for depositing a cheque at a self-service terminal such as an automated teller machine. The method comprises the steps of: transporting the cheque from an entrance slot to a process zone; determining whether to accept or reject the document; and electronically acquiring an image of the document. Thereupon the system identifies an electronic or telecommunications address of a device associated with the user; and in the event of accepting the document, transmits the acquired image of the cheque to the device address.

15 Claims, 5 Drawing Sheets

CHEQUE DEPOSIT AT A SELF-SERVICE TERMINAL

BACKGROUND OF THE INVENTION

The present invention relates to a self-service terminal (SST), such as an automated teller machine (ATM). In particular, the invention relates to an ATM for depositing cheques, whether or not cash is dispensed to the user.

A cheque cashing ATM allows a registered user, who typically does not have a bank account, to cash a cheque and receive money from the ATM in a public access, unattended environment. A user typically registers with an institution that owns or operates cheque cashing ATMs, and provides identification information (such as a social security number) and information about a cheque (usually a pay cheque) that he/she regularly receives. The registered user is typically provided with a card to initiate a cheque cashing transaction at a cheque cashing ATM.

To cash a cheque, a user enters his/her card at a cheque cashing ATM, then enters a cheque to be cashed through a cheque slot in the ATM's fascia. The ATM draws in and processes this cheque. If the cheque is valid, and the details printed on the cheque match the cheque information provided during registration, then the ATM informs the user of a surcharge that will be applied if the user wishes to cash the cheque.

If the user agrees to the surcharge then cash is dispensed to the user and the cheque is stored within the ATM. If the user does not agree to the surcharge then the cheque is returned to the user via the cheque slot.

The cheque may be returned to the user for other reasons, for example, if the cheque is not complete, if the cheque has not been endorsed by the user, if the ATM decides that the details printed on the cheque do not match the cheque information provided by the user during registration, and such like.

On other embodiments cheques can be cashed or deposited in a user's account without the aforementioned logging of regular cheques.

The use of such terminals for depositing cheques, which are to be credited to an account, is restricted in part due to customer unease in depositing their cheque at an automatic terminal. This problem has been addressed in a number of ways including printing a receipt for the user. However, there still persists a large degree of uncertainty and unease for some users who dislike depositing a cheque automatically for fear of a technical problem resulting in their account not being credited correctly.

SUMMARY OF THE INVENTION

It is among the objects of an embodiment of the present invention to obviate or mitigate the above disadvantage or other disadvantages of prior art self-service terminals and cheque deposit methods.

According to a first aspect of the present invention there is provided a self-service terminal comprising a fascia having a document entry/exit slot, a document processing module for processing documents entered via the slot; a control means, communication means; and a transport mechanism for transporting documents within the terminal, the control means being arranged to cause the communications means to identify an electronic or telecommunications address of a device associated with the user, such as a mobile telephone, and to send an image of the deposited document to the user's device address, following a successful attempt to deposit the document in the terminal.

Preferably, the transport mechanism is arranged to transport unacceptable documents to a reject bin.

Alternatively, the transport mechanism is arranged to return unacceptable documents to the user.

Preferably, the terminal is specifically arranged for the deposit of a financial cheque, the terminal being arranged either to provide the user with cash in return for the depositing of the cheque or to credit a user account.

Preferably, the terminal includes a display screen and control means arranged to control the display screen to present the user with an image of the deposited document which can be compared with that forwarded to the device address, during the deposit process.

According to a second embodiment of the present invention there is provided a system including a self-service terminal as described above; a telecommunications network; and at least one mobile device configured to receive an image of a document deposited in the terminal, via the telecommunications network.

Preferably, the device is a mobile telephone.

Preferably, the image is transmitted to the mobile telephone as an MMS message.

According to a third aspect of the present invention there is provided a method of depositing financial document, the method comprising the steps of: transporting the financial document from an entrance slot to a process zone; determining whether to accept or reject the document; electronically acquiring an image of the document; identify an electronic or telecommunications address of a device associated with the user; and in the event of accepting the document, transmitting said image to said device address.

Preferably the device is a mobile telephone. Most preferably the mobile phone is that of the user who deposited the document. However, the mobile telephone may be that of the person to whose account the document is to be credited, which may be someone different to the person who deposited the document.

Preferably, the document is a cheque, which is credited to an account associated with the user. Alternatively, the cheque could be cashed with money being dispensed by the SST.

Preferably, the user has pre-registered for the service and supplied information including the address of the device to which the image is to be transmitted. Alternatively, the user may input an electronic or telecommunications address or number during the transaction.

Other information, such as advertising, may be transmitted to the user with the image in order to offset the costs involved.

BRIEF DESCRIPTION OF THE DRAWINGS

An embodiment of the present invention will now be described, by way of example, with reference to the accompanying drawings, in which.

DETAILED DESCRIPTION

Figure 1:
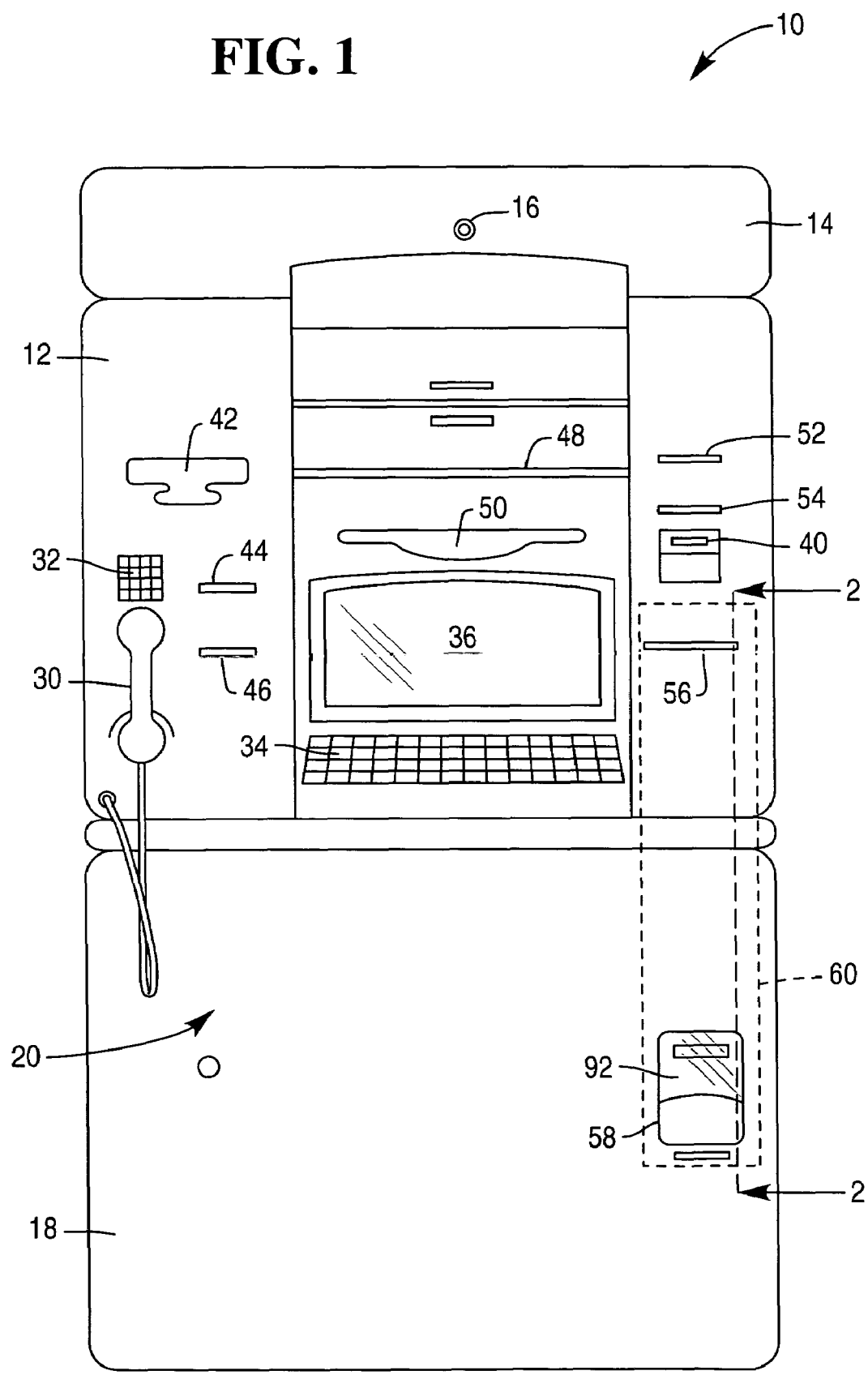
FIG. 1 is a pictorial diagram of a self-service terminal according to one embodiment of the present invention.

Reference is first made to FIG. 1, which illustrates a self-service terminal 10 in the form of a cheque deposit/cashing ATM. The ATM 10 comprises a fascia 12 pivotably coupled to a chassis (not shown); an upper panel 14 mounted to the chassis and defining an aperture 16 through which a camera (not shown) images a user of the ATM 10; and a lower panel 18 hingeably coupled to the chassis (not shown) so that the lower panel 18 can be opened to reveal a safe (not shown) mounted in the chassis (not shown).

When the lower panel 18 is open, the fascia 12 can be pivoted upwards to reveal ATM modules mounted within the chassis (not shown).

The fascia 12 and lower panel 18 provide a user interface 20 for allowing a user to execute a transaction. The fascia 12 includes a handset 30 and a telephone keypad 32 for allowing a user to contact a remote operator (not shown) typically located in a call centre (not shown). The fascia 12 also includes an encrypting keyboard 34 for allowing a user to enter transaction details, and a display 36 for presenting screens to a user.

The fascia 12 also defines eight slots for receiving and dispensing media items, and a tray 40 into which coins can be dispensed. The slots include: a money order printer slot 42, a bunch note input slot 44, a bunch note exit slot 46, a statement output slot 48, a cash dispense slot 50, a card reader slot 52, a card issue slot 54, and a cheque input/output slot 56. The slots 42 to 56 and tray 40 are arranged so that when the fascia 12 is closed, the slots and tray align with corresponding ATM modules mounted within the ATM's chassis (not shown).

The user interface features described above are all provided on an NCR PERSONAS (trade mark) 5878 financial services centre ATM, available from NCR Financial Solutions Group Limited, Discovery Centre, 3 Fulton Road, Dundee, DD2 4SW, Scotland.

However, in this embodiment of the invention an NCR PERSONAS (trade mark) 5878 ATM has been modified to include a lower dispense area 58. The dispense area 58 is located beneath the cheque input/output slot 56 and is fed by a cheque processing module 60 located within the ATM chassis (not shown).

Figure 2:
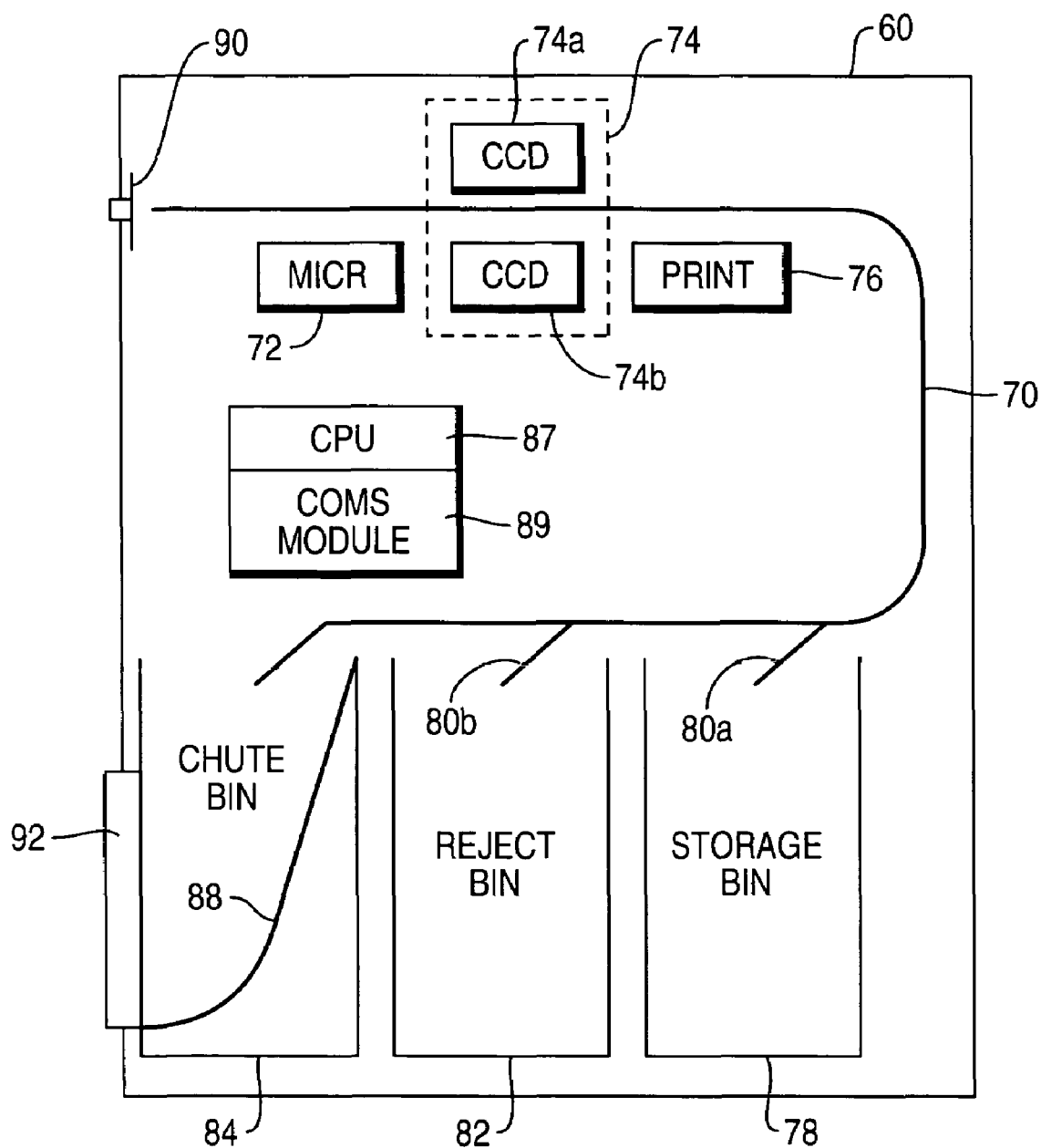
FIG. 2 is a simplified schematic sectional diagram showing a part (the document or cheque processing module) of the terminal of FIG. 1.
Figure 3:
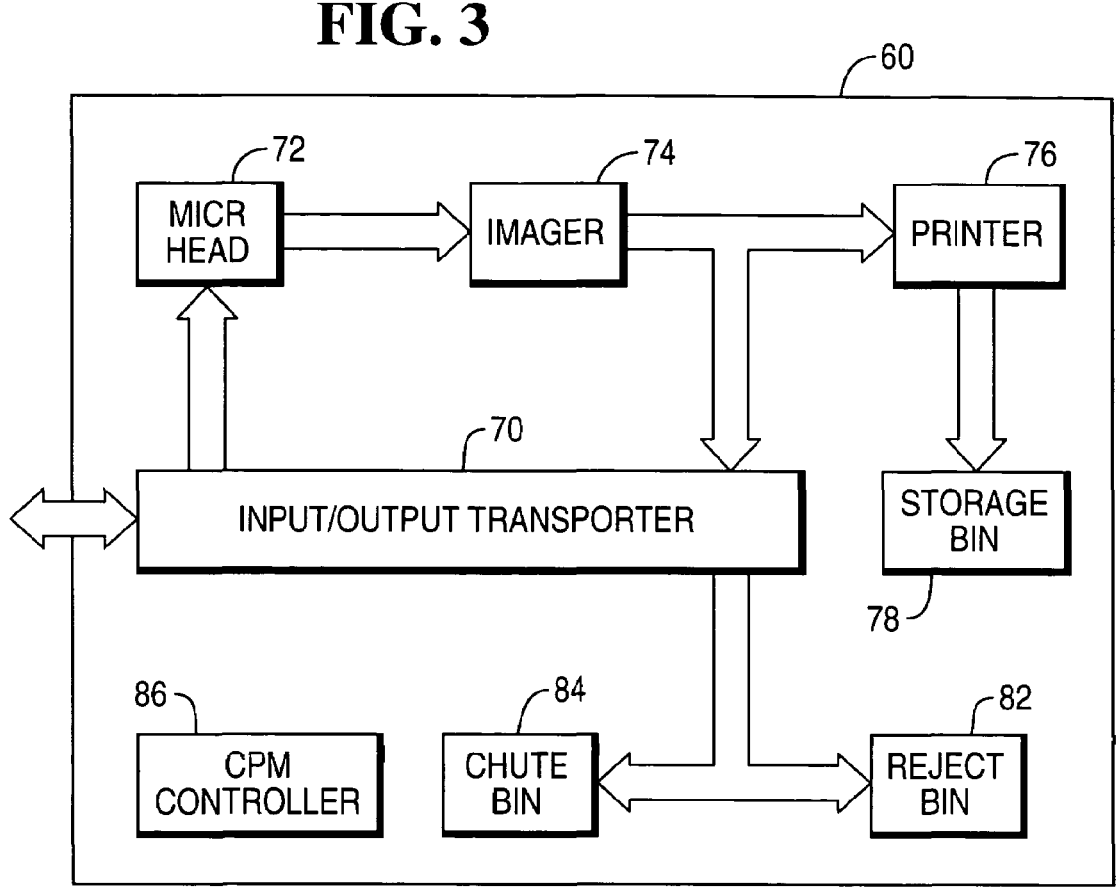
FIG. 3 is a pictorial diagram of a part (the lower dispense area) of the terminal of FIG. 1.
Figure 4:
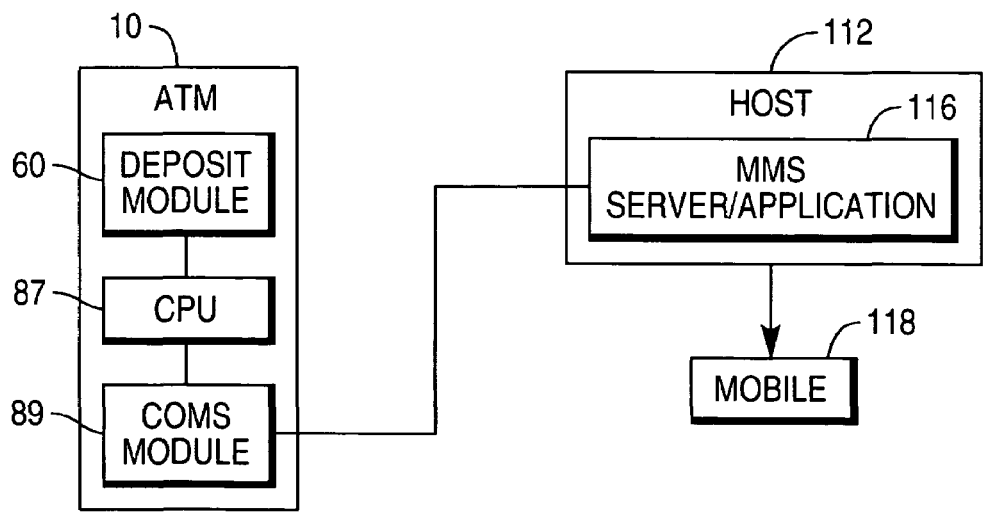
FIG. 4 is a schematic representation of a system in accordance with the present invention.

The cheque processing module (CPM) 60 will now be described with reference to FIG. 2 and FIG. 3. FIG. 2 is a simplified schematic sectional diagram (along line 2-2 in FIG. 1) showing part of the fascia 12 and lower panel 18, and the main parts of the CPM 60. FIG. 3 is a block diagram illustrating the main elements in the CPM 60.

The CPM 60 is a modified version of a conventional cheque processing module, such as the cheque processing module provided with the PERSONAS (trade mark) 5878 NCR ATM.

The CPM 60 comprises the following elements: a cheque input/output transport mechanism 70 including an alignment mechanism for aligning a cheque; a MICR head 72 for reading magnetic details on a code line of a cheque; an imager 74 including an upper 74a and lower 74b CCD camera for capturing an image of each side of a cheque (front and rear); a printer 76 for endorsing a cheque; and a storage bin 78 for storing processed cheques. The transport mechanism 70 includes two divert gates 80a, 80b for diverting cheques to either a reject bin 82 or a chute bin 84. The elements (70 to 82) are conventional and will not be described in detail herein.

The CPM 60 also includes a controller 86 for controlling the operation of the elements (70 to 80) within the CPM 60.

The chute bin 84 includes a chute 88 in the form of a steep, sloping plastics guide arranged to deliver a cheque from the transport mechanism 70 to the dispense area 58 using the force of gravity.

The CPM 60 also includes an entrance shutter 90 for opening and closing the cheque input/output slot 56, and a dispense area shutter 92 for allowing user access to the chute 88.

Included in the ATM CPU 87 is a control application that is operable to control internal ATM functionality, such as processing user inputs. The control application can additionally initiate communications with a service application 116 in the host 112. This is done through a communications module 89 that is connected to the host terminal 112. The service application 116 is operable to identify the current user from an ATM start transaction message, verify that user typically using information read from the user's bankcard and then effect any financial transactions in response to user inputs. The service application 116 includes an MMS application which is also able to send information relating to the financial transaction, including an image of a deposited document, to a pre-determined device, typically a mobile device 118, specified by the user. To allow for this, a record of the user's selected device 118 is stored at the host 112, together with a unique user identifier, such as. the user's unique banking identifier, so that as and when desired the host 112 can retrieve that information. Alternatively, a mobile telephone number may be entered as a part of the document deposit transaction, if the user is not pre-registered or if the user wishes the image to be sent to an alternatively device.

The capability of the user's mobile device 118 determines how the information is delivered; some examples of delivery mechanisms include GSM, GPRS. This delivery information, including an image of the deposited document, is stored in association with the user's mobile details, and used by the host to determine how to deliver the message. In order to maximize the scope of the system, the host 112 is typically provided with a plurality of different communication mechanisms (not shown). For example, the host 112 may include mobile telephone communication means to allow MMS messages to be sent or a facility for connecting to the internet and sending, for example, e-mails. In any case, the host 112 is able to identify the user's device address and send information directly to it. In this way the user receives a permanent electronic record of the transaction, including an image of the actual cheque deposited. This enhances user confidence in automatic deposit SST.

Figure 5A:
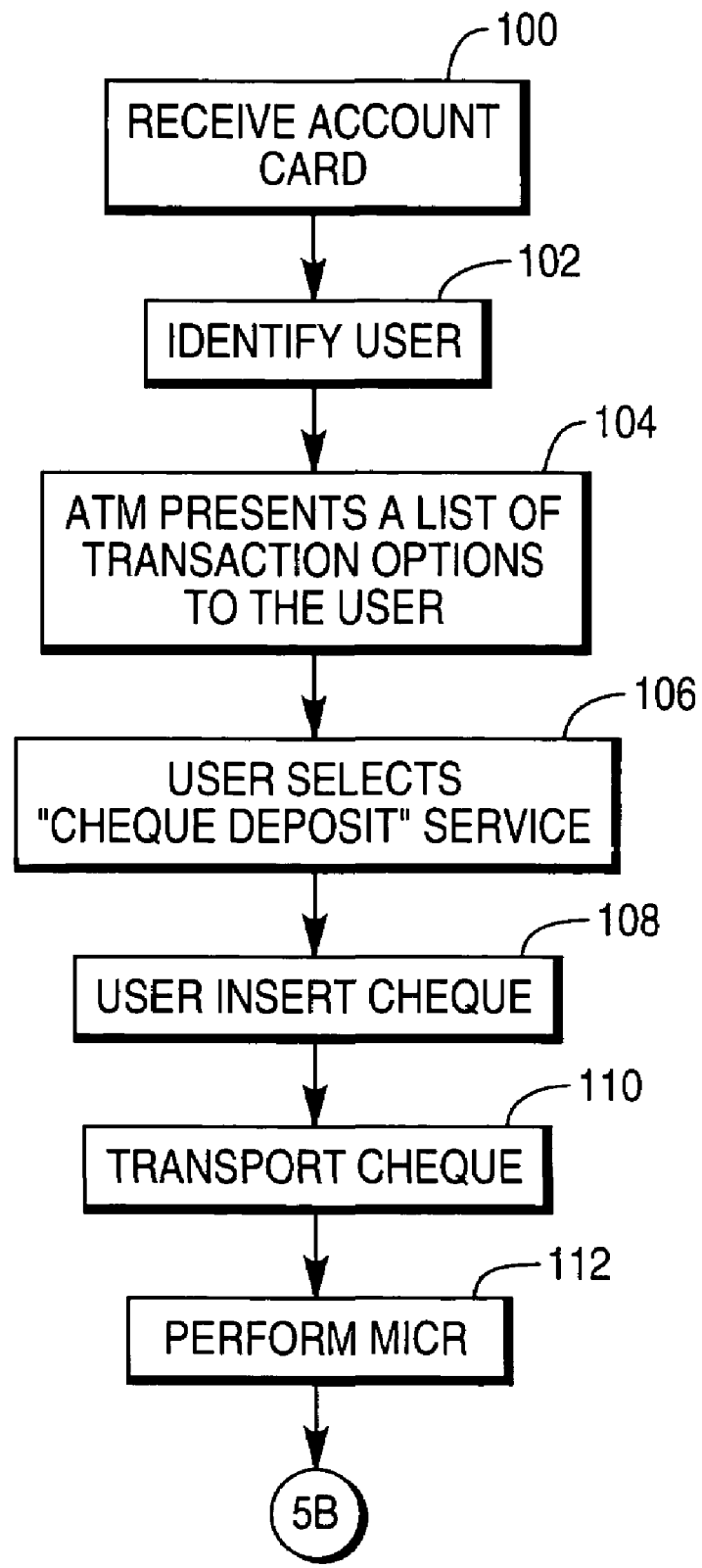
FIGS. 5A & 5B illustrate a flowchart illustrating the steps involved in a cheque deposit operation in accordance with the present invention.
Figure 5B:
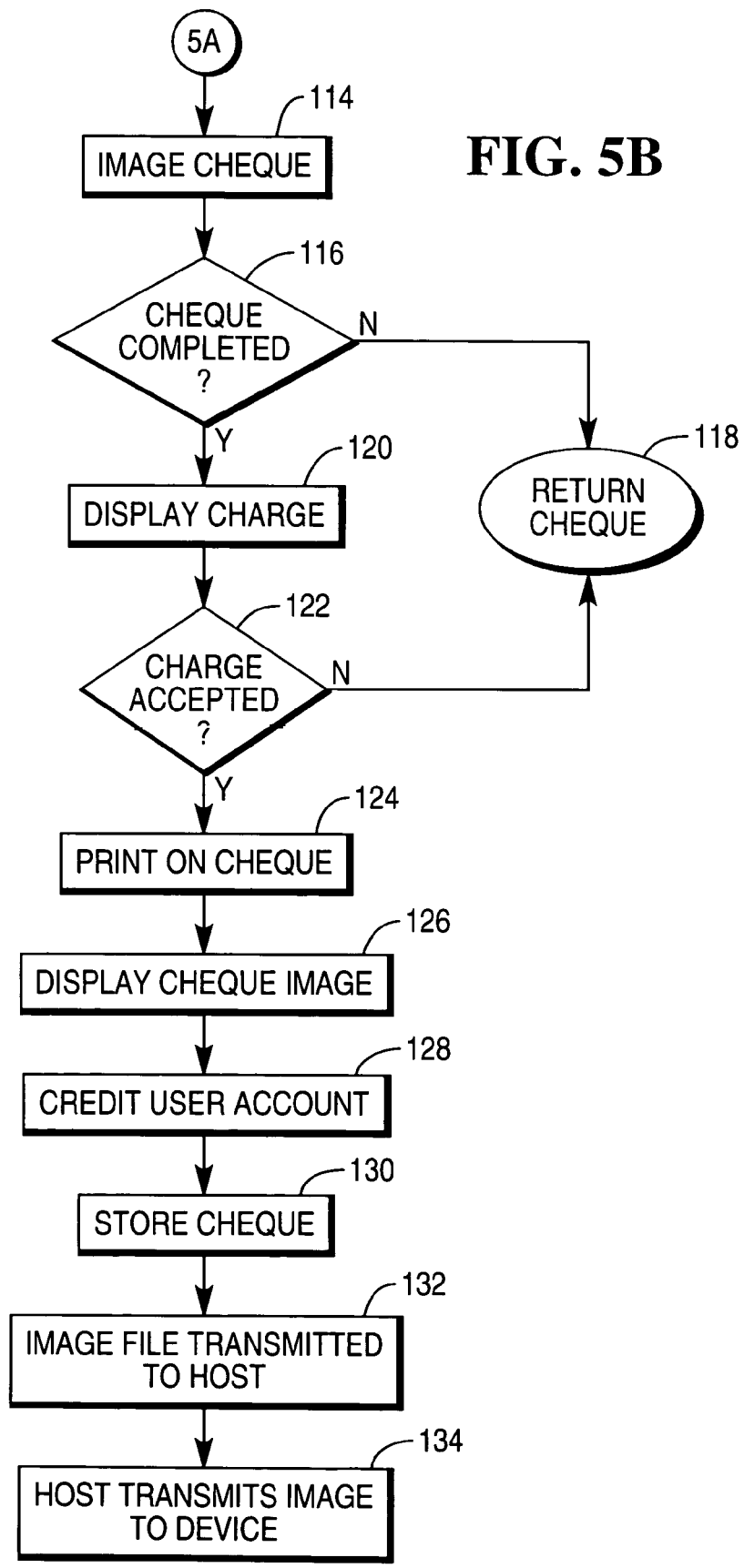

A typical transaction will now be described with reference to FIGS 5A and 5B (which illustrate a flowchart illustrating the steps involved in a cheque deposit transaction) and also with reference to FIGS. 1 to 4.

Initially, the user enters their account card into the card reader slot 52 (step 100) and is identified by the system (step 102). The SST then presents the user with a list of transaction options, on the display 36, (step 104), from which the user selects "cheque deposit" (step 106). The user then inserts the cheque to be deposited through the cheque input/output slot 56 (step 108).

Thereupon the CPM controller 87 opens the slot shutter 90 to receive the cheque, and transports the received cheque (step 110) to the MICR head 72 where a code line on the cheque is read (step 112).

The transport mechanism 70 then transports the cheque to the imager, where both sides of the cheque are imaged (step 114).

The ATM 10 then verifies that the cheque has been completed correctly (step 116). If the cheque is incomplete, then the CPM 60 initiates a standard cheque return operation (STEP 118), which will not be described herein. Alternatively, the cheque can be diverted t a reject bin 82, if for example there is thought to be something fraudulent regarding the attempted deposit of the cheque.

If the cheque is complete, the SST then displays a charge for use of the SST to deposit the cheque (step 120). If the user accepts the charge (step 122), then the CPM 60 prints endorsement data onto the cheque (step 124).

The ATM 10 then displays an image of the cheque to the user on the display 36 (step 126) and credits the amount of the cheque minus the surcharge, if appropriate, to an account detailed by the user (step 128). The account can either be detailed as part of the deposit process or a pre-registered account can be used. The CPM 60 then transports the cheque to the storage bin 78 (step 130) for subsequent collection and further processing.

The ATM 10 then transmits the file containing the image of the deposited cheque to the host 112 (step 132), from where it is transmitted onto the mobile phone 118 associated with the user (Step 134), preferably as an MMS message.

Various modifications may be made to the above described embodiment within the scope of the invention. For example, the above transaction assumes that a mobile device, such as a mobile phone, is pre-registered within the system, in respect of the user. However, if such a device has not been registered, or if the system is configured to offer an option, a screen is presented to the user requesting the input of a telephone number or other device address. The image is then sent to the device associated with the input address or number.

What is claimed is:

1. An Automated Teller Machine, ATM, comprising:
   a) a fascia having a document entry/exit slot;
   b) a document processing module for processing documents entered via the slot;
   c) a transport mechanism for transporting documents within the terminal;
   d) communication means; and
   e) control means for causing the communications means
      i) to identify an electronic or telecommunications address of a device associated with a user having no bank account accessible to the ATM, and
      ii) to send an image of the deposited document to the user's device address, following a successful attempt to deposit the document in the terminal.

2. ATM as claimed in claim 1, wherein the transport mechanism is arranged to transport unacceptable documents to a reject bin.

3. ATM as claimed in claim 1, wherein the transport mechanism is arranged to return unacceptable documents to the user.

4. ATM as claimed in claim 1, further comprising a display screen which is controlled by the control means arranged to present the user with an image of the deposited document, which can be compared with the image forwarded to the device address, during the deposit process.

5. ATM as claimed in claim 1, wherein the control means includes means for causing the communications means to identify an electronic or telecommunications address of a mobile telephone associated with the user.

6. ATM as claimed in claim 5, wherein the image is transmitted to the mobile telephone as an MMS message.

7. A method of operating an Automated Teller Machine, ATM, which is capable of depositing funds to a customer's bank account when the customer submits a bank check to the ATM, comprising:
   a) maintaining information which
      i) identifies a non-customer, who does not maintain a bank account to which the ATM can deposit funds, and
      ii) associates a receipt-address with the non-customer, which receipt-address receives electronic receipts;
   b) receiving a check submitted by the non-customer;
   c) using the information to identify the non-customer who submitted the check;
   d) generating an electronic image of the check;
   e) transmitting the electronic image to the receipt-address; and
   f) dispensing cash to the non-customer.

8. Method according to claim 7, and further comprising:
   f) displaying an image of the check to the non-customer at the ATM.

9. Method according to claim 7, in which the electronic image of the check includes both front and back sides of the check.

10. Method according to claim 7, wherein the receipt-address comprises a telephone number.

11. Method according to claim 7, and further comprising:
    f) indicating to the non-customer that a surcharge is levied for cashing the check; and
    g) inquiring whether the non-customer accepts the surcharge.

12. Method according to claim 7, in which the information also identifies types of checks which the non-customer will submit to the ATM.

13. A method of operating an Automated Teller Machine, ATM, which is capable of depositing funds to a customer's bank account when the customer submits a bank check to the ATM, comprising:
    a) at a relatively early time, accepting registration information from a non-customer who does not maintain a bank account accessible to the ATM, which registration information
       i) identifies the non-customer and
       ii) may also specify a receipt-address;
    b) at a later time, in a transaction,
       i) identifying the non-customer;
       ii) accepting a bank check from the non-customer;
       iii) generating an electronic image of the bank check;
       iv) dispensing cash to the non-customer; and
       v) transmitting the electronic image to the receipt-address, if specified.

14. Method according to claim 13, and further comprising:
    vi) displaying the electronic image to the non-customer at the ATM.

15. Method according to claim 13, and further comprising:
    vi) if a receipt-address is not contained in the information, prompting the non-customer to provide a receipt-address during the transaction.

* * * * *